(12) United States Patent
Mainguet et al.

(10) Patent No.: US 10,378,961 B2
(45) Date of Patent: *Aug. 13, 2019

(54) THERMAL PATTERN SENSOR

(71) Applicants: COMMISSARIAT À L'ÉNERGIE ATOMIQUE ET AUX ÉNERGIES ALTERNATIVES, Paris (FR); IDEMIA IDENTITY & SECURITY FRANCE, Issy-les-Moulineaux (FR)

(72) Inventors: Jean-François Mainguet, Grenoble (FR); Josep Segura Puchades, Fontaine (FR); Margaux Vigier, Sassenage (FR)

(73) Assignees: COMMISSARIAT À L'ÉNERGIE ATOMIQUE ET AUX ÉNERGIES ALTERNATIVES, Paris (FR); IDEMIA IDENTITY & SECURITY FRANCE, Issy-les-Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/779,787

(22) PCT Filed: Nov. 28, 2016

(86) PCT No.: PCT/EP2016/078988
§ 371 (c)(1),
(2) Date: May 29, 2018

(87) PCT Pub. No.: WO2017/093179
PCT Pub. Date: Jun. 8, 2017

(65) Prior Publication Data
US 2018/0356291 A1    Dec. 13, 2018

(30) Foreign Application Priority Data
Nov. 30, 2015 (FR) ...................... 15 61579

(51) Int. Cl.
*G01J 5/46* (2006.01)
*G01J 5/34* (2006.01)
(Continued)

(52) U.S. Cl.
CPC ................. *G01J 5/34* (2013.01); *G01J 5/061* (2013.01); *G06K 9/0002* (2013.01); *G01J 2005/063* (2013.01); *G01J 2005/345* (2013.01)

(58) Field of Classification Search
None
See application file for complete search history.

(56) References Cited

U.S. PATENT DOCUMENTS 4,394,773 A    7/1983    Ruell
4,429,413 A    1/1984    Edwards
(Continued)

FOREIGN PATENT DOCUMENTS

| EP | 0798546 A1 | 10/1997 |
|---|---|---|
| EP | 2385486 B1 | 3/2013 |
| WO | 2008/107450 A1 | 9/2008 |

OTHER PUBLICATIONS

International Search Report for International Application No. PCT/EP2016/078988 dated Jan. 18, 2017.
(Continued)

*Primary Examiner* — David P Porta
*Assistant Examiner* — Mamadou Faye
(74) *Attorney, Agent, or Firm* — Pearne & Gordon LLP

(57) ABSTRACT

A thermal pattern sensor comprising a plurality of pixels, each pixel comprising at least one pyroelectric capacitor formed by at least one portion of pyroelectric material arranged between a lower electrode and an upper electrode, in which one of the lower and upper electrodes corresponds to an electrode for reading the pixel and in which a heating element that can heat the portion of pyroelectric material of
(Continued)

the pyroelectric capacitor of the pixel by Joule effect during a measurement of the thermal pattern by the pyroelectric capacitor of the pixel is formed by the other of the lower and upper electrodes.

14 Claims, 3 Drawing Sheets

(51) Int. Cl.
*G06K 9/00* (2006.01)
*G01J 5/06* (2006.01)

(56) References Cited

U.S. PATENT DOCUMENTS

| | | | |
|---|---|---|---|
| 6,091,837 A | 7/2000 | Dinh | |
| 6,289,114 B1 | 9/2001 | Mainguet | |
| 6,532,040 B1* | 3/2003 | Kozlowski | H03F 3/087 |
| | | | 250/208.1 |
| 7,385,381 B1* | 6/2008 | Mainguet | G01D 5/2405 |
| | | | 324/71.1 |
| 2009/0206851 A1* | 8/2009 | Chuang | G06K 9/0002 |
| | | | 324/686 |
| 2011/0280276 A1* | 11/2011 | Mainguet | G01J 5/024 |
| | | | 374/102 |
| 2014/0354597 A1* | 12/2014 | Kitchens, II | G06F 1/3215 |
| | | | 345/175 |
| 2015/0191309 A1 | 7/2015 | Mainguet et al. | |
| 2016/0314858 A1 | 10/2016 | Blanchard et al. | |
| 2018/0032781 A1 | 2/2018 | Mainguet et al. | |
| 2018/0032782 A1 | 2/2018 | Mainguet et al. | |

OTHER PUBLICATIONS

Written Opinion for International Application No. PCT/EP2016/078988 dated Jan. 18, 2017.

Preliminary French Search Report issued in Patent Application No. FR 15 61579 dated Aug. 4, 2016.

U.S. Appl. No. 15/900,505; entitled "Print Sensor with Gallium Nitride LED", filed Feb. 20, 2018.

U.S. Appl. No. 15/922,204; entitled "Optical Imaging Device", filed Mar. 15, 2018.

\* cited by examiner

THERMAL PATTERN SENSOR

This is a National Stage application of PCT international application PCT/EP2016/078988, filed on Nov. 28, 2016, which claims the priority of French Patent Application No. 15 61579, filed Nov. 30, 2015, both of which are incorporated herein by reference in their entirety.

TECHNICAL FIELD AND PRIOR ART

The invention relates to a thermal pattern sensor, for example a thermal detection fingerprint sensor.

It is known to produce a fingerprint sensor comprising thermal detection means. Said thermal detection means may correspond to pyroelectric elements, diodes, thermistors or any other temperature sensitive element making it possible to convert a variation in temperature into a variation in electrical potential or current.

Fingerprint detection may be carried out by so-called "passive" sensors exploiting a difference in temperature between the finger and the sensor, as described in the documents U.S. Pat. Nos. 4,394,773, 4,429,413 and 6,289,114. These sensors have however the drawback of carrying out a measurement that depends uniquely on the difference in temperature between the finger and the sensor. It may thus happen that the level of the signal obtained is zero when the finger and the sensor are at the same temperature, or that the contrast of the captured images varies and then poses problems during later processing of the images.

In order to eliminate the problems raised by passive thermal sensors, and especially in the case of a static acquisition where the finger does not move, so-called "active" fingerprint sensors have been proposed, such as for example that described in the documents U.S. Pat. No. 6,091,837 and EP 2 385 486 A1. In such a sensor, each pixel comprises a pyroelectric capacitance formed of two conductive electrodes between which a portion of pyroelectric material is arranged, and a heating element. Said heating element dissipates a certain amount of heat in the pixel, and the heating of the pixel is measured at the end of a certain acquisition time, called integration time, in the presence of the finger on the sensor. This makes it possible to distinguish, at each pixel, the presence of a ridge or a valley of the detected fingerprint depending on whether the heat is absorbed by the skin (pixel in the presence of a ridge of the fingerprint) or conserved in the pixel (pixel in the presence of a valley of the fingerprint). This leads to a lower final temperature in the case of a pixel in the presence of a ridge, where the heat is absorbed by the skin, compared to a pixel in the presence of a valley.

To the first order, such a sensor makes it possible to measure the heat capacity, also called specific heat or specific heat capacity, of an element in contact with the sensor. The measurements obtained also depend on the thermal conductivity between the sensor and the part of the element (ridge or valley in the case of a fingerprint) in presence.

To form an active heat sensor, the pixels of said sensor are coupled to heating elements that generally use the Joule effect which dissipates heat from a resistive element which is fed by a current. One of the levels of the technological stack forming the pixels is advantageously used to form these heating elements. For example, it is possible to use one of the conductive levels serving to form the transistors and the interconnections of the sensor if one of said levels comprises a conductive material having a suitable resistivity and to which it suffices to apply one of the voltages already available, for example the supply voltage of the sensor, to generate heating by Joule effect. This is notably used when the sensor comprises transistors of TFT (Thin-Film Transistor) type formed on a glass substrate.

The pixels of such a sensor are arranged by forming a matrix of several lines and several columns. The reading of the pixels is generally carried out line by line. The heating elements may then also be controlled line by line by means of a transistor at the head of each line and thereby not have to add control transistors in the pixels. Each line of heating elements is for example connected, on one side of the matrix of pixels, to ground, and on the other side to a control transistor connected to a suitable power supply in such a way as to control the current flowing through the heating elements, and thus the thermal power injected by Joule effect into the pixels by said heating elements.

In the document EP 2 385 486 A1, the heating elements are formed from a metal layer also serving to form upper and lower electrodes of the pyroelectric capacitances of the pixels. These heating elements are for example produced in the form of a conductive coil partially surrounding each of the upper or lower electrodes in the pixels. A single metal thus serves to form distinct elements (heating elements and upper or lower electrodes of the pyroelectric capacitances) fulfilling distinct functions. FIG. 1 schematically shows such a configuration, in which a same metal level, here the upper metal level, serves for the formation of the upper electrodes 10 and a conductive coil 12 partially surrounding the upper electrodes 10 and making it possible to heat laterally the pyroelectric capacitances formed at the level of the upper electrodes 10.

The use of a same metal level to form these upper, or lower, electrodes and the heating elements has however the drawback of ending up with an arrangement of the heating elements besides the pyroelectric capacitances of the pixels. These heating elements thus produce a lateral heating of the pyroelectric capacitances. Yet, such lateral heating is not optimal, notably when said pixel resorts to a pyroelectric material which is not a good heat conductor.

It is possible to form the heating elements using an additional metal level, different from those serving to form the upper or lower electrodes of the pyroelectric capacitances, arranged above or below the pixels. This has however the drawback of moving the heating elements further away from the pyroelectric capacitances. In addition, the addition of such a metal level represents an additional cost compared to the preceding solution which uses a same metal level to form the upper or lower electrodes of the pyroelectric capacitances and the heating elements.

DESCRIPTION OF THE INVENTION

One aim of the present invention is to propose an active thermal pattern sensor, that is to say comprising elements for heating the pixels of the sensor, not having the drawbacks of active sensors of the prior art.

To do so, the present invention proposes a thermal pattern sensor comprising a plurality of pixels, each pixel comprising at least one pyroelectric capacitance formed by at least one portion of pyroelectric material arranged between a lower electrode and an upper electrode, in which one of the lower and upper electrodes corresponds to an electrode for reading the pixel and in which a heating element that can heat the portion of pyroelectric material of the pyroelectric capacitance of said pixel by Joule effect during a measurement of the thermal pattern by the pyroelectric capacitance of said pixel is formed by the other of the lower and upper electrodes.

It is thus proposed to use directly one of the lower and upper electrodes of the pyroelectric capacitance of the pixel to form the heating element intended to heat the portion of pyroelectric material. Thus, the heating element is located as near as possible to the pyroelectric material intended to be heated, which greatly increases the quantity of heat that is transmitted to it by the heating element compared to the configuration of the prior art in which the heating element is formed from the same electrically conductive layer as that serving for the formation of one of the upper and lower electrodes but which is arranged beside the pyroelectric capacitance. This increase in the heating capacity is also found compared to a heating element formed in an additional metal layer other than those serving for the formation of the electrodes of the pyroelectric capacitances.

The invention proposes, in a non-obvious manner, directly using one of the electrodes of the pyroelectric capacitance of a pixel to form the heating element of said pixel, which comes down to using a heating resistance of the pixel also serving for the biasing of the pyroelectric capacitance of the pixel. This is possible due to the fact that the application of a constant heating voltage to the electrically conductive element forming at the same time one of the electrodes of the pyroelectric capacitance of the pixel and the heating element can also be used as such to bias the pyroelectric capacitance.

Such a sensor also has the advantage of simplifying the design for producing electrodes compared to sensors of the prior art in which the heating elements and the upper electrodes are produced from a same conductive layer but in forming distinct elements.

The heating voltage applied to the electrode forming the heating element is for example such that a non-zero difference in electrical potentials is obtained between two ends, or two terminals, of this electrode, thereby bringing about a circulation of a heating current through said electrode. Said current is sufficiently important so that the Joule effect obtained makes it possible to carry out the measurement of the thermal pattern. This is not the case when a constant electrical potential is applied to the whole of a conductive element because, in this case, no difference in electrical potentials is obtained at the terminals of said conductive element, and thus no circulation of current enabling heating of said conductive element is obtained.

Said other of the lower and upper electrodes may comprise ends at the terminals of which a heating voltage is applied, creating a non-zero difference in electrical potentials between these ends. The sensor may comprise means for applying this heating voltage. During a measurement of the thermal pattern, the value of these electrical potentials may be substantially constant throughout the measurement.

The expression "that can heat the portion of pyroelectric material of the pyroelectric capacitance of said pixel by Joule effect during a measurement of the thermal pattern by the pyroelectric capacitance of said pixel" signifies that the Joule effect obtained is sufficiently important so that at the end of a certain measurement time (the integration time), the measurement obtained, that is to say the variation in electrical charges in the pyroelectric capacitance, corresponding to the measured temperature difference, is significant to detect the thermal pattern. Thus, undesirable current leaks do not make it possible to obtain a significant variation in electrical charges to detect the thermal pattern. The Joule effect obtained may be such that a variation in temperatures of at least 0.5 K, for example around 1 K, of the pyroelectric material between a pixel in contact with skin and a pixel which is not in contact with skin may be obtained. The choice of the value of this variation in temperature depends notably on the sensitivity of the pyroelectric material, the size of the pixel and the noise of the reading circuit.

The expression "thermal pattern" designates a spatial distribution of the thermal characteristics of an object which is detectable by the sensor, for example the pattern of a fingerprint.

The sensor may be capable of measuring the thermal pattern of an element by direct contact (and not via a radiation of said element as in the case of a sensor measuring, at a distance, a temperature) between the sensor and said element. The element may be arranged against the sensor during the measurement of the thermal pattern of said element, with in this case a thermal contact made between the element and the sensor.

The electrode for reading a pixel corresponds to the electrode on which the electrical charges generated in the pyroelectric capacitance of the pixel are recovered then sent to a reading circuit of the sensor.

The pyroelectric material may comprise for example a polyvinylidene fluoride or PVDF, and/or a poly(vinylidene fluoride-trifluoroethylene) or P(VDF-TrFE), and/or a ceramic such as PZT (lead zirconate titanate), and/or crystals such as those known by the acronym TGS (Tris Glycine SDF) or $LiTaO_3$ crystals. Other pyroelectric materials are possible, notably all those that produce electrical charges as a function of a pyro-piezoelectric parameter.

This configuration is advantageous because the structure of the sensor, which integrates the heating element as near as possible vis-à-vis the pyroelectric material, compensates the low thermal conductivity of PVDF, or any other pyroelectric material with low thermal conductivity.

The sensor may further comprise a substrate on which are arranged the pyroelectric capacitances of the pixels, the lower electrode of the pyroelectric capacitance of each pixel being able to be arranged between the substrate and the portion of pyroelectric material of the pyroelectric capacitance of the pixel, and the upper electrode of the pyroelectric capacitance of each pixel may form the heating element of said pixel. In this configuration, it is proposed to use the upper electrode of the pyroelectric capacitance of the pixel as heating resistance and as biasing electrode to which a constant electrical potential is applied. It is in this case the lower electrode, that is to say that which is the closest to the substrate, which serves as electrode for reading the electrical charges generated in the pixel.

The electrodes of the pyroelectric capacitances of the pixels corresponding to the electrodes for reading the pixels may be formed by first distinct portions of electrically conductive material and electrically insulated from each other.

The electrodes of the pyroelectric capacitances of the pixels corresponding to the heating elements may be electrically connected together and be formed by at least one second portion of electrically conductive material provided with two ends to which a heating voltage of the pyroelectric material of the pyroelectric capacitances of said pixels is capable of being applied. In this configuration, the heating voltage intended to be applied to the ends of the second portion of electrically conductive material also forms the biasing potentials of the pyroelectric capacitances of said pixels. These potentials are different from one pixel to the next. By maintaining a constant heating voltage during a measurement, the biasing potentials are thus also constant throughout the measurement, which makes it possible in the end to measure the variation in electrical charges created in the pyroelectric capacitances.

In one advantageous embodiment, the sensor may be such that:
the pixels are arranged by forming a matrix of several lines and several columns of pixels,
the electrodes of the pyroelectric capacitances of each line of pixels corresponding to the heating elements are electrically connected together and are formed by a second portion of electrically conductive material distinct from the second portions of electrically conductive material of the other lines of pixels,
each second portion of electrically conductive material comprises two ends to which a heating voltage of the pyroelectric material of the pyroelectric capacitances of the line of pixels is capable of being applied.

In this advantageous embodiment, the electrodes forming the heating elements of each line of pixels may correspond to a single second portion of electrically conductive material. Distinct heating voltages (but not necessarily of different value) are intended to be applied to the ends of each of the second portions of electrically conductive material. Each line of pixels is thus heated independently of each other, which is well suited when the matrix of pixels is read line by line because this avoids needlessly heating pixels intended to be read later. This configuration also makes it possible to have a uniform integration time for all the pixels of the matrix.

In this case, one of the two ends of each second portion of electrically conductive material may be electrically connected together. The ends connected together may be connected to ground.

Each second portion of electrically conductive material may comprise, at each of the electrodes formed by said second portion of electrically conductive material, parts of which the electrical resistance is greater than that of the remainder of said second portion of electrically conductive material. Such a configuration makes it possible to concentrate the heating at the pyroelectric capacitances and to reduce loss of heat between the pyroelectric capacitances.

The difference in electrical resistance may be obtained thanks to parts of smaller dimensions, for example width and/or thickness, compared to the remainder of the portion of conductive material.

The sensor may further comprise means for applying the heating voltage to the ends of the second portion(s) of electrically conductive material such that, during a measurement of the thermal pattern by one of the pixels, the value of the electrical potential on the electrode forming the heating element of said pixel is substantially constant throughout the measurement.

The pixels may be arranged by forming a matrix of several lines and several columns of pixels. Each pixel may comprise at least one line selection transistor capable of receiving on its gate a control signal common to the entire line of pixels to which said pixel belongs and, when the line selection transistor is in the on state, to electrically connect the electrode for reading said pixel to a reading circuit including at least one amplifier and common to the pixels of the column to which said pixel belongs.

In a first configuration, the line selection transistor may be connected to an inverting input of the amplifier, and the reading circuit may further comprise:
means for applying a reference voltage to a non-inverted input of the amplifier,
a switch, or commutator, connecting the inverting input of the amplifier to the output of the amplifier,
a capacitance, for example a condenser, connecting the inverting input of the amplifier to the output of the amplifier.

In this first configuration, the reading circuit carries out a reading of a current, that is to say a direct reading of the electrical charges generated by the pyroelectric capacitances.

In this case, the sensor may further comprise a control circuit capable of implementing, for reading a line of pixels, at least the following steps:
turning on the line selection transistors of the pixels of said line and closing the switches of the reading circuits,
application of the heating voltage to the ends of the second portion of electrically conductive material or of one of the second portions of electrically conductive material associated with said line of pixels,
opening the switches of the reading circuits,
waiting for an integration time corresponding to the measurement of the thermal pattern by the pixels of said line,
reading an output voltage of the amplifier.

The first step of turning on the line selection transistors and closing the switches of the reading circuits makes it possible to set the potentials of the active nodes of the pixels of the line read at an initial known value corresponding to the value of the reference voltage applied to the non-inverting inputs of the amplifiers of the reading circuits.

When the heating time of the pixels of a line read is greater than the integration time by these pixels, the reading method may comprise, between the start of heating of the pixels and the start of measurement of the thermal pattern, turning off the line selection transistors of the pixels of said line, then, after opening the switches of the reading circuits, turning on the line selection transistors of the pixels of said line.

In this configuration, the control circuit may stop the application of the heating voltage to the ends of the second portion of electrically conductive material of this line of pixels after reading the pixels of this line.

In a second configuration, each pixel may further comprise:
a reset transistor capable of applying a reset voltage to the electrode for reading the pixel,
a voltage follower transistor of which a gate is connected to the electrode for reading the pixel and of which one of the source and drain electrodes is connected to the line selection transistor.

In this second configuration, the reading circuit carries out a voltage reading of the measurement made due to the fact that the voltage follower transistor makes a copy of the voltage of the reading electrode which is next read by the amplifier.

In this case, the sensor may further comprise a control circuit capable of implementing, for reading a line of pixels, at least the following steps:
turning on the reset transistors of the pixels of said line,
turning off the line selection transistors of the pixels of said line,
application of the heating voltage to the ends of the second portion of electrically conductive material or one of the second portions of electrically conductive material associated with said line of pixels,
turning off the reset transistors of the pixels of said line, waiting for an integration time corresponding to the measurement of the thermal pattern by the pixels of said line, turning on the line selection transistors of the pixels of said line, reading the voltages applied to the inputs of the amplifiers of the reading circuits.

At start of the implementation of the above steps, the reset transistors are in the on state so that the reset voltages are applied to the reading electrodes of the pixels read.

BRIEF DESCRIPTION OF THE DRAWINGS

The present invention will be better understood on reading the description of exemplary embodiments given for purely indicative purposes and in no way limiting and by referring to the appended drawings in which.

Identical, similar or equivalent parts of the different figures described hereafter bear the same numerical references in order to make it easier to go from one figure to the next.

The different parts shown in the figures are not necessarily according to a uniform scale, in order to make the figures more legible.

The different possibilities (alternatives and embodiments) should be understood as not being mutually exclusive and may be combined together.

DETAILED DESCRIPTION OF PARTICULAR EMBODIMENTS

Figure 1:
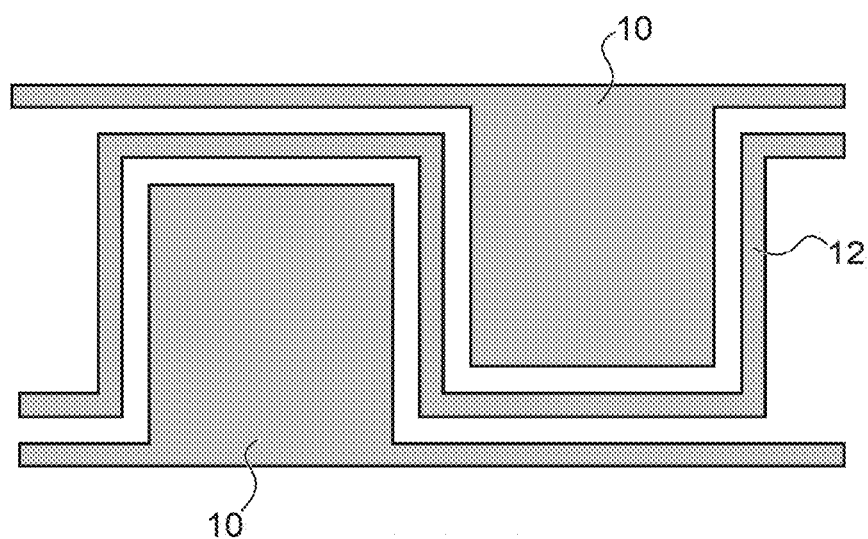
FIG. 1 shows a top view of a part of a thermal pattern sensor according to the prior art.
Figure 2:
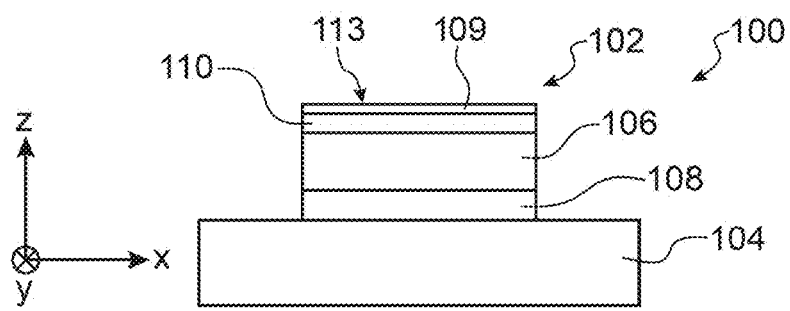
FIG. 2 shows a sectional view of a pyroelectric capacitance of a pixel of a thermal pattern sensor, the subject matter of the present invention.

Reference is firstly made to FIG. 2 which shows a sectional view of a pyroelectric capacitance of a pixel 102, which forms the thermal detection element of the pixel 102, of a thermal pattern sensor 100.

The sensor 100 comprises a substrate 104 corresponding for example to a glass substrate or a semiconductor substrate (for example silicon). A substrate 104 made of glass may be used when the sensor 100 is produced with TFT transistors, whereas a substrate 104 made of semiconductor, for example silicon, may be used when the sensor 100 comprises transistors produced using MOS technology. The substrate 104 may also be a flexible substrate, for example comprising polyimide or PEN (polyethylene naphthalate) or PET (polyethylene terephthalate), on which the electronic elements of the sensor 100 are produced by printed electronic technology (for examples via a production with ink jet type print heads) or by lithography.

The pixels 102 of the sensor 100 are arranged by forming a matrix of several lines and several columns of pixels 102.

The pitch of the pixels 102, in the plane (X,Y) (that is to say the plane of the substrate 104), is for example comprised between around 25 µm and 100 µm. In the case of a sensor 100 of resolution equal to 500 dpi (dots per inch), the pitch of the pixels 102 is equal to 50.8 µm.

Each of the pixels 102 of the sensor 100 comprises thermal measurement, or detection, means formed by a pyroelectric capacitance. Each pyroelectric capacitance comprises a portion 106 of pyroelectric material arranged between a lower electrode 108 and an upper electrode 110. The pyroelectric material of the portion 106 is advantageously P(VDF-TrFE) or PVDF. In an alternative, the pyroelectric material of the portion 106 may be AlN or PZT, or any other pyroelectric material suitable to form a pyroelectric capacitance. The thickness of the portion 106 is for example comprised between around 500 nm and 10 µm.

The electrodes 108, 110 each comprise at least one electrically conductive material, for example a metal material such as titanium of thickness equal to around 0.2 µm, and/or molybdenum and/or aluminium and/or a conductive oxide such as ITO (indium tin oxide) and/or a conductive polymer. One of the electrodes 108, 110, advantageously the upper electrode 110, or each of the two electrodes 108, 110, may be formed by a stack of several electrically conductive materials, for example a Ti/TiN/AlCu stack. The thickness of each of the electrodes 108, 110 is for example comprised between around 0.1 µm and 1 µm.

A protective layer 109, corresponding for example to a layer of aluminium nitride or any other material suited to the production of said layer, covers the upper electrode 110. The thickness of the protective layer 109 may be comprised between several microns and around 100 µm. An upper face 113 of the protective layer 109 corresponds to the surface above which is located the thermal pattern intended to be detected, for example a finger of which the fingerprint is intended to be detected.

In order that the PVDF of the portion 106 acquires its pyroelectric (and also piezoelectric) properties, said material is subjected, once in the lifetime of the pyroelectric capacitance, to an electric field of around 100 volts per micron of thickness of PVDF. The molecules inside the PVDF become oriented, and thus remain oriented, even when the PVDF is no longer subjected to this electric field. The PVDF thereby be may biased by applying an initial biasing voltage to the terminals of the electrodes 108, 110.

After this initial biasing, when the portion 106 is subjected to a variation in temperature ΔT, this variation in temperature ΔT causes the appearance of an additional electric field generating charges ΔQ between the electrodes 108, 110 such that:

$$\Delta Q = S \cdot \gamma \cdot \Delta T.$$

The parameter S corresponds to the surface of the portion 106 facing each of the electrodes 108, 110. The parameter γ corresponds to the pyroelectric coefficient of the pyroelectric material of the portion 106. For example, the pyroelectric coefficient γ of PVFD is equal to around 32 µC/m$^2$/K.

The portion 106 and the electrodes 108, 110 forming a capacitance of value C to which are added parasitic capacitances Cp, the charges ΔQ generated induce a difference in electrical potentials ΔV between the electrodes 108, 110 such that:

$$(C+C_p) \cdot \Delta V = \Delta Q = S \cdot \gamma \cdot \Delta T.$$

In addition to the charges generated by the capacitance of value C, other charges are also generated via the parasitic capacitances Cp present, for example those connected to the gate of the reading transistor in the case of a voltage reading circuit.

When the potential on the reading electrode (formed by one of the electrodes 108, 110) is fixed (so-called "current" reading), the charges generated flow to the reading circuit by forming an integrated current at the output, with in this case:

$$\frac{\Delta Q}{\zeta} = \frac{S \cdot \gamma \cdot \Delta T}{\zeta}.$$

with $\zeta$ corresponding to the integration time during which the measurement is carried out by the pixel. Such a current reading has the advantage of being insensitive, to the first order, to the value of the capacitances, in particular the parasitic capacitances.

The sign of the electric voltage $\Delta V$ obtained between the electrodes 108, 110, or the direction of current in the case of a reading in current, depends on the direction of the electric field in which the PVDF of the portion 106 has been initially biased. In the case of certain other pyroelectric materials such as aluminium nitride, this initial biasing direction depends on the manner in which the pyroelectric material has been deposited, its order and its crystallographic orientation. Moreover, the electric voltage $\Delta V$ obtained, or the direction of current, may be positive or negative depending on whether the variation in temperature undergone by the pyroelectric capacitance is positive or negative.

The sensor 100 also comprises heating elements dissipating a certain amount of heat in the pixels 102, and notably in the portion 106 of pyroelectric material. Unlike pyroelectric sensors of the prior art, these heating elements are not elements transferred beside or above or below the pyroelectric capacitances, but are formed directly by one of the electrodes 108, 110 of each of the pyroelectric capacitances. In the example of FIG. 2, the heating element of the pyroelectric capacitance of the pixel 102 is formed by the upper electrode 110. The other electrode of the pyroelectric capacitance, here the lower electrode 108, serves as electrode for reading the pixel 102.

The heating of the portion 106 of pyroelectric material is obtained by making a current circulate in the electrode intended to form the heating element. Yet, this electrode also serves for the biasing of the pyroelectric capacitance. Thus, the heating resistance of each of the pixels 102 thus also serves for the biasing of an electrode of the pyroelectric capacitance formed by the portion 106 and the electrodes 108, 110 of each of the pixels 102 during the measurement carried out by these pixels 102 (the biasing applied during a measurement is different from the initial biasing of the PVDF described previously).

The use of one of the electrodes 108, 110 of the pixels 102 to form the heating elements is possible due to the fact that the value of the electrical potential applied to this electrode during reading of the thermal pattern is constant.

Figure 3:
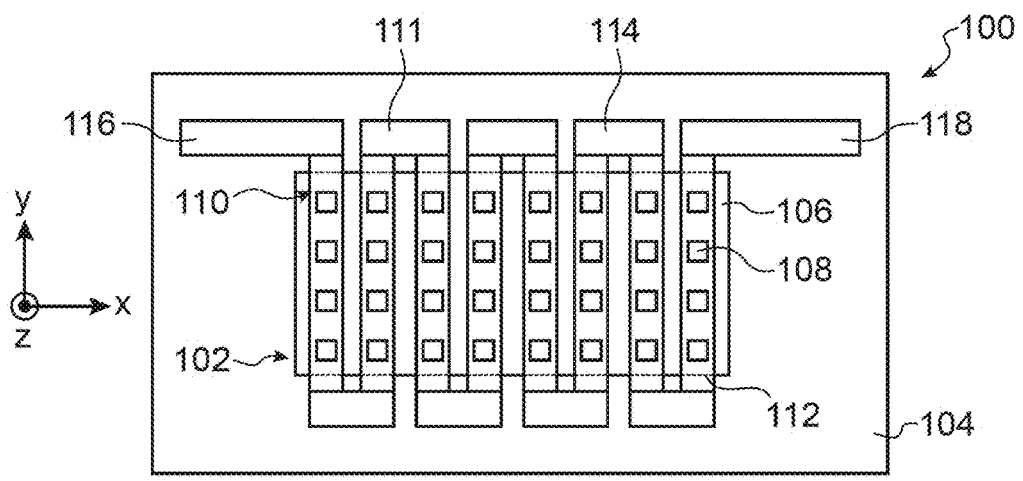
FIG. 3 shows a top view of a part of a thermal pattern sensor, the subject matter of the present invention, according to a first embodiment.

FIG. 3 shows a top view of several pixels 102 of the sensor 100 according to a first embodiment.

The lower electrodes 108, which correspond to the electrodes for reading the pixels on which the charges generated by the pyroelectric capacitances will be recovered to be read, are formed by first distinct portions of electrically conductive material and electrically insulated from each other. These first conductive portions each have a rectangular section in the plane of the substrate 104 (plane (X,Y)), and are arranged beside each other in the form of a matrix in order to form the matrices of pixels 102. The pyroelectric material is produced in the form of a single portion 106 covering all the lower electrodes 108. The upper electrodes 110 of the pixels are formed by a second portion of electrically conductive material 111 common to all the pixels 102 and forming the heating elements of the pixels 102. The upper electrodes 110 of the pixels 102 are thus electrically connected together. The second portion of electrically conductive material 111 is composed of several parts 112 extending parallel to each other and covering each of the parts of the portion 106 forming the pyroelectric capacitances of a same column of the matrix of pixels 102. Other parts 114 of the second portion of electrically conductive material 111 connect in series the parts 112 and extend perpendicularly to these parts 112. The second portion of electrically conductive material 111 forming the upper electrodes 110 of the pixels 102 here has a "coil" shape.

The second portion of electrically conductive material 111 also comprises two ends 116, 118 to which a heating voltage is intended to be applied. One of the two ends 116, 118 is for example connected to ground, and a non-zero heating potential is applied to the other end by heating means for example formed by an electrical connection applying an existing voltage in the sensor to the end 116. For example, if the end 118 is connected to ground and if a heating potential $V_{heating}$ is applied to the end 116, a current then flows from the end 116 to the end 118 of the second portion 111, causing heating by Joule effect in the second portion 111, and thereby heating the portion 106 of the pixels 102. The value of the heating voltage is chosen as a function of the desired heating power, said power notably being a function of the thickness of the portion 106 intended to be heated as well as the thickness of the protective layer 109, the pyroelectric coefficient of the material of the portion 106, the sensitivity of the reading circuit, the noise level of the reading circuit and the integration time. In a pixel 102, the heating power is for example comprised between around 0.1 mW and 10 mW.

Advantageously, for all the embodiments of the invention, the second portion of conductive material 111 serving as resistance for heating the pixels 102 also forms the upper electrode 110 of the pixels 102 which is arranged above the pyroelectric material and not the lower electrode 108 because this arrangement makes it possible to connect to the ground of the sensor 100 the conductive portions of the pyroelectric capacitances which are the closest to the exterior of the sensor 100. Such an arrangement forms a protection vis-à-vis electrostatic discharges (ESD) because if such a discharge happens, there then exists a preferential path for the electrical charges to flow due to this discharge, which limits voltage breakdowns with the fragile active elements of the sensor 100 such as transistors.

Figure 4:
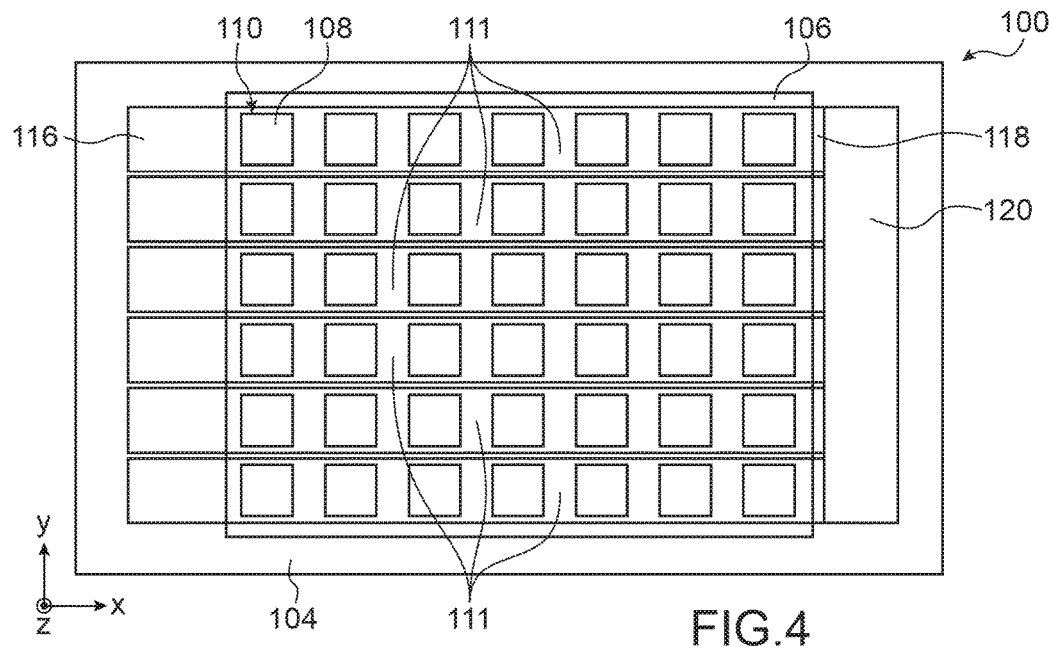
FIG. 4 shows a top view of a part of a thermal pattern sensor, the subject matter of the present invention, according to a second embodiment.

A sensor 100 is also proposed according to a second embodiment, shown in FIG. 4. In this second embodiment, the sensor 100 comprises several second portions of conductive material 111 each forming the upper electrodes 110 of the pixels 102 arranged on a same line. Six second portions of conductive material 111 are shown in FIG. 4. Each of the second portions 111 comprises a first end 116 to which is applied a heating potential, and a second end 118 connected to another conducting portion 120 common to all the second portions 111 and connected to ground. The electrical potentials applied to the first ends 116 of the second portions 111 are similar from one portion 111 to the other.

Compared to the first embodiment, this second embodiment makes it possible to heat and bias each line of pixels 102 independently of each other, which simplifies the reading of the pixels 102. This reduces notably the risk of non-uniformity of reading of the pixels 102 which could be due to a delay in reading the pixels 102. The power required for heating the pixels 102 is also reduced because the pixels 102 are not all heated simultaneously.

The values of the heating voltages applied to the second portions 111 are adjusted compared to the resistivity of the metal of the second portions 111 in order to produce the desired thermal energy in the pixels 102. For example, a sensor 100 is considered comprising a matrix of 400×300 pixels at 500 dpi (which corresponds to the pixels 102 arranged beside each other with a pitch of 50.8 μm). For such a sensor 100, when the second portions 111 comprise titanium, each have a thickness equal to around 200 nm and have a resistivity of the order of 2 Ohm per square, each of the second portions 111 forming the upper electrodes 110 of a line of 400 pixels each having a width (dimension along the Y axis of FIG. 4, that is to say the dimension located in the plane in which extends the main surface of the second portion 111 and which is perpendicular to the main dimension, that is to say the length, of the second portion 111) equal to around 40 μm has a resistivity equal to 400×50/40=500 squares, is 1 kOhm. To obtain a dissipated power per pixel 102 equal to around 0.1 mW, i.e. around 40 mW for each line of pixels 102, an electrical potential of around 6.3 V is applied to each of the ends 116 of the second portions 111. In order to obtain around 1 mW of dissipated power per pixel, an electrical potential of around 20 V is applied to each of the ends 116 of the second portions 111.

Figure 5:
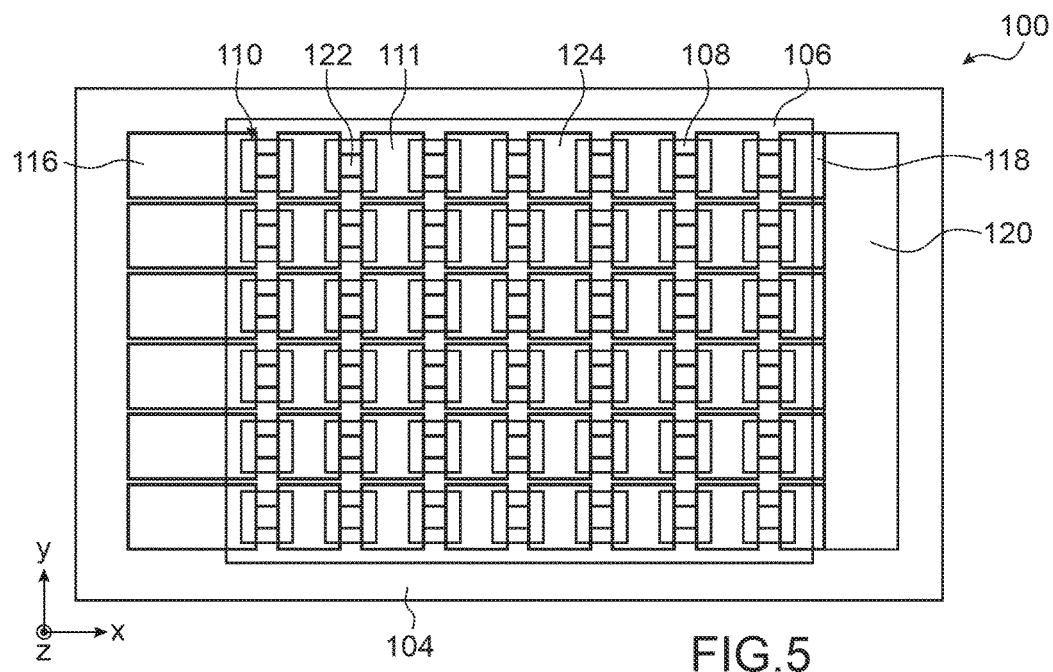
FIG. 5 shows a top view of a part of a thermal pattern sensor, the subject matter of the present invention, according to an alternative of the second embodiment.

In the second embodiment shown in FIG. 4, the second portions 111 form conductive strips of uniform width extending along a line of pixels 102. The heat is thereby diffused in a uniform manner along each conductive strip. According to an alternative embodiment shown in FIG. 5, the width of each of the second portions 111 is not uniform over its whole length. Parts 122 of each second portion 111 located facing the lower electrodes 108, that is to say centred on each pixel 102, have a width less than that of other parts 124 arranged astride and above two pixels and each connecting two parts 122. This alternative embodiment makes it possible to concentrate the heating produced on each pixel 102 and to limit heat losses between the pixels 102 due to the fact that the electrical resistance increases at the junction between a part 122 and an adjacent part 124 (these junctions being located on the pixels 102 and not between the pixels 102), which causes a more important Joule effect and a more important injection of heat at these junctions. The fact of having hot points centred on the pixels 102 also reduces problems of diathermy, that is to say the lateral transfer of heat between neighbouring pixels. This alternative brings about however a slight reduction in the pyroelectrical charges generated due to the fact of the reduction in surface of the pyroelectric material facing the second portions 111, which signifies that a compromise has to be found between the different thermal parameters, the reading speeds, etc.

These hot points centred on the pixels 102 may be formed not by reducing the width of each of the second portions 111 at the pixels 102, but by reducing the thickness of conductive material of the second portions 111 at the pixels 102.

In an alternative of the embodiments described previously, the conductive portions serving both for the biasing of the pyroelectric capacitances and for the heating of the pyroelectric material of the pixels 102 may correspond not to those forming the upper electrodes 110 of the pixels 102 but those forming the lower electrodes 108 of the pixels 102. In addition, shapes, or designs, of the conductive portion(s) which form both one of the electrodes of the pyroelectric capacitance of each pixel 102 and the heating elements of these pixels 102 other than those described previously may be envisaged.

Apart from the pyroelectric capacitances of the pixels 102, the sensor 100 also comprises electronic elements making it possible to read the electrical charges generated by the pyroelectric capacitances and thus to read the thermal pattern detected by the sensor 100.

Figure 6:
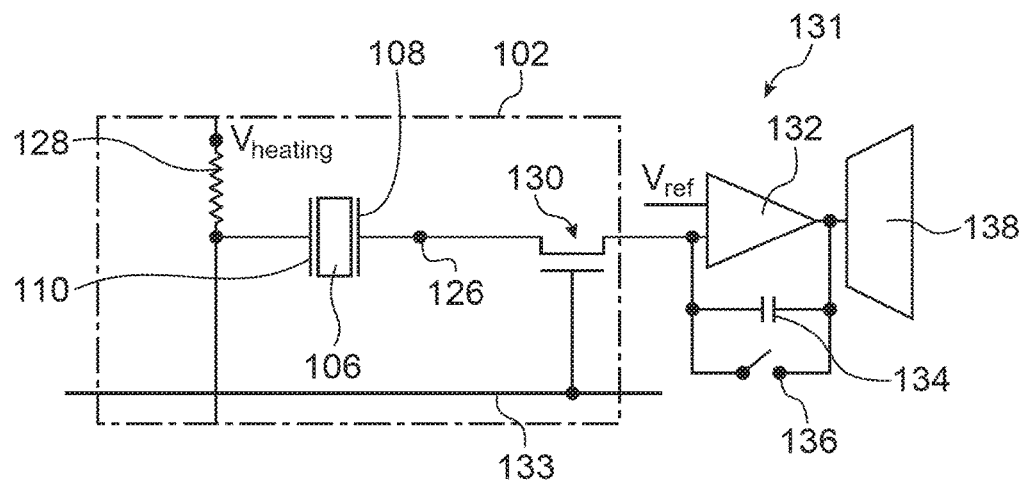
FIGS. 6 and 7 show first and second exemplary embodiments of circuits for reading the pixels of a thermal pattern sensor, the subject matter of the present invention.

FIG. 6 shows a first exemplary embodiment of these electronic elements making it possible to read the variation in electrical charges appearing in the pyroelectric capacitance of one of the pixels 102 of the sensor 100.

The pixel 102 shown in FIG. 6 comprises a pyroelectric capacitance formed by a portion 106 of pyroelectric material arranged between two electrodes 108, 110. A heating potential $V_{heating}$ making it possible to heat the portion 106 of pyroelectric material is applied to one of the two electrodes of the pyroelectric capacitance, for example the upper electrode 110 as in the embodiments described previously. The electrically conductive material to which is applied the heating potential $V_{heating}$ forms a resistive heating element symbolised by a heating resistance 128. The other electrode (the lower electrode 108 in the example described here) forms an electrode for reading the pixel 102 and is connected to an active node 126 of the pixel 102.

Each pixel 102 comprises a line selection transistor 130. The gate of the transistor 130 is connected to an electrical connection 133 common to all the transistors 130 of a same line and on which a selection signal is intended to be applied. A first of the source and drain electrodes of the transistor 130 is connected to the active node 126 and a second of the source and drain electrodes of the transistor 130 is connected to an input of a reading circuit 131 located at the foot of the column. This input of the reading circuit 131 corresponds to the inverting input of a reading amplifier 132 corresponding for example to an operational amplifier. An electrical biasing potential $V_{ref}$ is applied to the non-inverter input of the amplifier 132. The output of the amplifier 132 is looped back on its inverting input through a capacitance 134. A switch, or commutator, 136 is connected in parallel to the capacitance 134 and makes it possible to short circuit the capacitance 134. The output of the reading amplifier 132 is also connected to the input of an analogue/digital converter 138. The reading amplifier 132, the capacitance 134, the switch 136 and the analogue/digital converter 138 are common to all the pixels 102 of a same column. The analogue/digital converter 138 may be common to all the pixels 102 of the sensor 100, subject to the addition of electronic multiplexing elements between the outputs of the reading amplifiers 132 and the analogue/digital converter 138.

During a measurement of a variation in temperature of the pixel 102, the pixel 102 is firstly reset by closing the switch 136 (if this was previously in open position) and by turning on the transistor 130. The potential $V_{ref}$ is then applied to the node 126. The heating voltage is applied to the ends of the second portion 111 of the pyroelectric capacitance of the pixel 102. The pyroelectric capacitance is at this moment at a temperature $T_0$. The switch 136 is next opened. The integration starts then at the pyroelectric capacitance of the pixel 102, during an integration time $\zeta$ for example equal to around 30 μs. Electrical charges are generated by the pyroelectric capacitance of the pixel 102 during this integration time $\zeta$. Due to the fact that the switch 136 is open and that the transistor 130 is on, the electrical charges generated by the pyroelectric capacitance of the pixel 102 flow to the capacitance 134 associated with the pixel 102. At the end of this integration time $\zeta$, the pyroelectric capacitance is at the temperature $T_1$ and thus has been subjected to a variation in temperature $\Delta T=T_1-T_0$, the electrical charges generated by the pyroelectric capacitance and stored in the capacitance 134 being the consequence of this variation in temperature. The electrical potential at the output of the amplifier 132 is thus $V_{out}=Q \cdot C_{ref}+V_{ref}$, with Q corresponding to the electrical charges generated and $C_{ref}$ the value of the capacitance 134. This potential is then read and sampled by the analogue/digital converter 138. When the operation of reading and sampling the result is finished, the switch 136 is switched to the closed position in order to discharge the capacitance 134 and the transistor 130 is placed in the off state to isolate the pixel 106 and to enable the reading of another pixel of the column. This reading operation is implemented simultaneously for all the pixels 102 of a same line.

During such a reading, the electric potential $V_{heating}$ applied to one of the electrodes of the pyroelectric capacitance is constant throughout the reading of a pixel. On the other hand, due to the fact that the second portion of conductive material 111 to which said potential is applied is common to several pixels 102, the value of the heating potential applied to one of the electrodes of the pyroelectric capacitances of each of these pixels 102 is different from one pixel to the next. By considering for example the second embodiment shown in FIG. 4, the upper electrode 110 of the pyroelectric capacitance the closest to the end 116 is subjected to a potential substantially equal to $V_{heating}$. The upper electrode 110 of the following pyroelectric capacitance is subjected to an electrical potential substantially equal to $V_{heating}-\delta V$. The value of the electrical potentials applied to the upper electrodes 110 of the pyroelectric capacitances decrease proportionally to their distance vis-à-vis the end 116. When the conducting portion 120 is connected to the ground, the upper electrode 110 of the last pyroelectric capacitance, corresponding to that which is neighbouring the conducting portion 120, is subjected to an electrical potential substantially equal to 0V, that is to say the electrical potential of the ground. This variation in the electrical heating potential applied from one pixel to the next does not modify the heating produced from one pixel to the next due to the fact that the flow of current in the second conducting portion 111 causing the heating is the same in all the second conducting portions 111 and the same for all the pixels 102 because the heating resistances 128 of all the pixels 102 are identical.

At the reading of the pixels, the value of the potentials on each electrode are different from one pixel to the next. On the other hand, for a same variation in temperature, the voltage at the terminals of the pyroelectric capacitances is identical. Yet, it is the excess charges generated compared to the reference voltage that are read, whether they are positive or negative. For example, in the case of the first exemplary embodiment shown in FIG. 6, the resulting reading voltage obtained at the output of the amplifier 132 is $V_{out}=V_{ref}\pm\Delta Q/Cf$, with Cf corresponding to the value of the capacitance 134, which is independent of the voltage at the terminals of the pyroelectric capacitances when the potential $V_{heating}$ is stable during the integration time.

In the first exemplary embodiment described previously in relation with FIG. 6, the electrical charges generated are read directly by the amplifier 132. Due to the fact that the electronic reading elements in each pixel 102 only correspond to a single transistor 130, this first exemplary embodiment is well suited for the production of the transistor 130 using amorphous TFT technology, the production cost of which is low. In addition, in this first exemplary embodiment, the reading time by the amplifier 132 is short, for example comprised between around 1 and 10 µs, or even zero if the pixel 102 is connected to the amplifier 132 during the integration as is the case in the example described previously. Finally, in TFT technology, the circuit comprising the pixels 102 is distinct from that comprising the elements 132, 134, 136 and 138, these circuits being assembled next by transfer of one on the other or by other solutions (Chip on Flex, wires, etc.).

Figure 7:
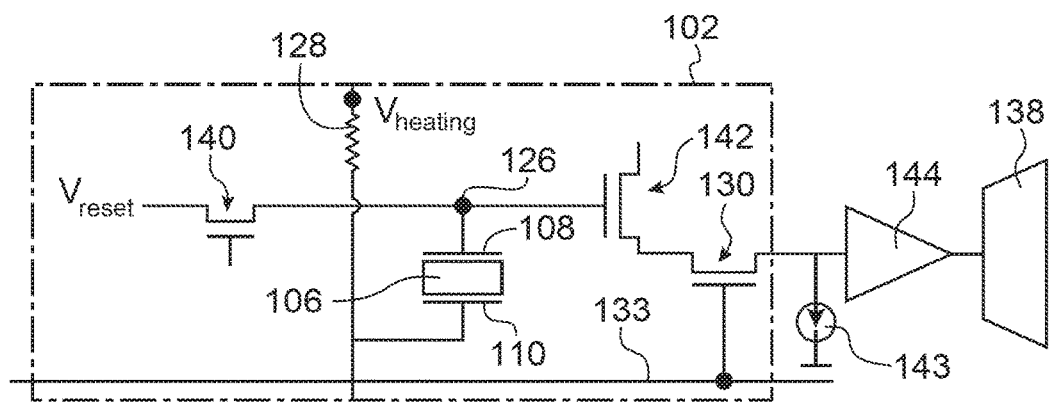

FIG. 7 shows a second exemplary embodiment of the electronic elements making it possible to read in voltage the measurements of the pixels 102 of the sensor 100.

As in the first exemplary embodiment, each pixel 102 comprises the pyroelectric capacitance connected to the active node 126. Each pixel 102 is also provided with a reset transistor 140 of which one of the source and drain electrodes is connected to the node 126 and of which the other of the source and drain electrodes is subjected to the application of a reset voltage $V_{reset}$. A control signal for resetting the pixel 102 is applied to the gate of the reset transistor 140. This resetting makes it possible to place the electrical potential of the node 126 at a known value (here $V_{reset}$) at the start of the integration, as well as to empty the charges from the pyroelectric capacitance once the reading has finished. As for the control of the pixel line selection transistor 130, the control of the reset transistor 140 may be common to an entire line of pixels 102.

Unlike the first exemplary embodiment in which the node 126 is directly connected to a first of the source and drain electrodes of the transistor 130, the node 126 is here connected to a gate of another transistor 142 forming a voltage follower and producing an amplification of the read signal, that is to say of the potential of the reading electrode 108, evolving with the electrical charges generated by the pyroelectric capacitance of the pixel 102. An electrical supply potential is applied to a first of the source and drain electrodes of the transistor 142 and a second of the source and drain electrodes of the transistor 142 is connected to the first of the source and drain electrodes of the transistor 130. A second of the source and drain electrodes of the transistor 130 is connected to the input of the reading circuit 131 formed of an amplifier 144, inverter or not, of gain G. The output of the amplifier 144 is connected to the input of the analogue/digital converter 138. A current source 143 is also coupled to the input of the amplifier 144 in order to bias rapidly the transistor 142 in an operating zone where it behaves as voltage follower.

In this second exemplary embodiment, the reading of a pixel 102 is carried by means of three transistors, for example of MOS type. The reading is carried out in voltage and benefits from the local amplification produced by the follower transistor 142 which blocks the flow of charges on the active node 126. The transistors may be made from polysilicon or IGZO.

This second exemplary embodiment carries out a non-destructive reading of the charges generated by the pyroelectric capacitances. Indeed, as long as the active node 126 has not undergone resetting, the electrical charges generated are conserved.

In the case of the second exemplary embodiment shown in FIG. 7, the resulting reading voltage obtained at the output of the amplifier 144 depends on the value of the pyroelectric capacitance in addition to the parasitic capacitances present on the active node 126, and is equal to $G(V_{reset}\pm\Delta Q/C_{pyro})$. In this second exemplary embodiment, it is possible to heat the portions 106 of pyroelectric material by applying a difference in potentials going from $V_{heating}$ to ground between the ends 116 and 118 of each of the second portions of conductive material 111.

When the electronic reading elements correspond to those of the second exemplary embodiment described previously, the reading of one of the pixels 102 of the device 100 may be carried out by implementing the following steps:

resetting the pyroelectric capacitance via the turning on of the reset transistor 140, turning off the line of pixels selection transistor 130, switching on the heating of the portion of pyroelectric material 106 of the pixel 102 via the application of the potential $V_{heating}$ to one of the electrodes of the pyroelectric capacitance associated with the pixel 102 intended to be read, turning off the reset transistor 140, start of integration of the pixel 102 which is then at the temperature $T_0$, waiting for the integration time $\zeta$, for example equal to 30 μs, reading the pixel 102, corresponding to the turning on of the transistor 130 which makes it possible to recopy the voltage received on the gate of the follower transistor 142 to the amplifier 144 and to sample the value obtained after this conversion, corresponding to the variation in temperature $\Delta T = T_1 - T_0$, turning off the heating of the portion of pyroelectric material 106.

Generally speaking, the integration time $\zeta$ will be comprised between around 30 μs and 1 ms in order to obtain a variation in temperature comprised between around 0.5 K and 2 K.

Moreover, whether the reading is carried out in charges (or in current) or in voltage, the switching on and switching off of the heating are not carried out during the integration time $\zeta$ and the reading. Indeed, switching on the heating makes the potential of one of the electrodes of the pyroelectric capacitances vary in an important manner. This variation is thus found on the other electrode of the pyroelectric capacitances. This variation in potential is, for certain pixels, much greater than the signal intended to be read by these pixels. For the same reason, it is advisable to limit as much as possible all the parasites on the potential $V_{heating}$ during the integration time, in particular those linked to current draws arising from the operation of other electronic parts.

Whatever the embodiment of the electronic reading elements of the sensor 100, the pixels 102 are advantageously read line by line.

Although not shown, the sensor 100 comprises a control circuit making it possible to apply the control signals described above to drive the reading of the pixels 102.

The thermal pattern detected by the sensor 100 advantageously corresponds to a fingerprint.

Although not shown, the sensor 100 may further comprise an electronic processing circuit capable of constructing an overall image of the thermal pattern from measurements made at each of the pixels 102. This electronic processing circuit may also be capable of comparing said image with several images stored in a database in order to identify if the thermal pattern detected corresponds to one of those stored in the database. The electronic processing circuit may also be capable of displaying an image of the thermal pattern detected.

Moreover, the sensor 100 advantageously comprises, in addition to the thermal detection elements described previously, optical or capacitive detection elements making it possible to detect an image of the element of which the thermal pattern is also detected. Thus, the sensor 100 may comprise a matrix of optical detection pixels interlaced with thermal detection pixels.

What is claimed is:

1. A thermal pattern sensor comprising:
    a plurality of pixels, each pixel comprising at least one pyroelectric capacitance formed by at least one portion of pyroelectric material arranged between a lower electrode and an upper electrode, in which one of the lower and upper electrodes corresponds to an electrode for reading the pixel and in which a heating element that can heat the portion of pyroelectric material of the pyroelectric capacitance of said pixel by Joule effect during a measurement of the thermal pattern by the pyroelectric capacitance of said pixel is formed by the other of the lower and upper electrodes; and
    means for applying a heating voltage at ends of the electrode which forms the heating elements, creating a non-zero difference in electrical potentials and a circulation of a heating current between said ends.

2. The thermal pattern sensor according to claim 1, in which the pyroelectric material comprises PVDF and/or P(VDF-TrFE) and/or PZT.

3. The thermal pattern sensor according to claim 1, further comprising a substrate on which are arranged the pyroelectric capacitances of the pixels, the lower electrode of the pyroelectric capacitance of each pixel being arranged between the substrate and the portion of pyroelectric material of the pyroelectric capacitance of the pixel, and in which the upper electrode of the pyroelectric capacitance of each pixel forms the heating element of said pixel.

4. The thermal pattern sensor according to claim 1, in which the electrodes of the pyroelectric capacitances of the pixels corresponding to the electrodes for reading the pixels are formed by first distinct portions of electrically conductive material and electrically insulated from each other.

5. The thermal pattern sensor according to claim 1, in which the electrodes of the pyroelectric capacitances of the pixels corresponding to the heating elements are electrically connected together and are formed by at least one second portion of electrically conductive material provided with two ends to which the heating voltage of the pyroelectric material of the pyroelectric capacitances of the pixels is being applied.

6. The thermal pattern sensor according to claim 1, in which:
    the pixels are arranged by forming a matrix of several lines and several columns of pixels,
    the electrodes of the pyroelectric capacitances of each line of pixels corresponding to the heating elements are electrically connected together and are formed by a second portion of electrically conductive material distinct from the second portions of electrically conductive material of the other lines of pixels,
    each second portion of electrically conductive material comprises two ends to which the heating voltage of the pyroelectric material of the pyroelectric capacitances of the line of pixels is being applied.

7. The thermal pattern sensor according to claim 6, in which one of the two ends of each second portion of electrically conductive material are electrically connected together.

8. The thermal pattern sensor according to claim 6, in which each second portion of electrically conductive material comprises, at each of the electrodes formed by said second portion of electrically conductive material, parts of which the electrical resistance is greater than that of the remainder of said second portion of electrically conductive material.

9. The thermal pattern sensor according to 5, wherein during a measurement of the thermal pattern by one of the pixels, the value of the electrical potential on the electrode forming the heating element of said pixel is substantially constant throughout the measurement.

10. Sensor (100) according to claim 5, in which the pixels (102) are arranged by forming a matrix of several lines and several columns of pixels (102), and in which each pixel (102) comprises at least one line selection transistor (130) configured to receive on its gate a control signal common to the entire line of pixels (102) to which said pixel (102) belongs and, when the line selection transistor (130) is in the on state, electrically connecting the electrode for reading said pixel (102) to a reading circuit (131) including at least one amplifier (132, 144) and common to the pixels (102) of the column to which said pixel (102) belongs.

11. Sensor (100) according to claim 10, in which the line selection transistor (130) is connected to an inverting input of the amplifier (132), and in which the reading circuit (131) further comprises:
- means for applying a reference voltage to a non-inverting input of the amplifier (132),
- a switch (136) connecting the inverting input of the amplifier (132) to the output of the amplifier (132),
- a capacitance (134) connecting the inverting input of the amplifier (132) to the output of the amplifier (132).

12. Sensor (100) according to claim 11, further comprising a control circuit configured to implement, for reading a line of pixels (102), at least the following steps:
- turning on the line selection transistors (130) of the pixels (102) of said line and closing the switches (136) of the reading circuits (131),
- application of the heating voltage to the ends (116, 118) of the second portion (111) of electrically conductive material or one of the second portions (111) of electrically conductive material associated with said line of pixels (102),
- opening the switches (136) of the reading circuits (131),
- waiting for an integration time corresponding to the measurement of the thermal pattern by the pixels (102) of said line,
- reading an output voltage of the amplifier (132).

13. Sensor (100) according to claim 10, in which each pixel (102) further comprises:
- a reset transistor (140) configured to apply a reset voltage to the reading electrode (108) of the pixel (102),
- a voltage follower transistor (142) of which one gate is connected to the reading electrode (108) of the pixel (102) and of which one of the source and drain electrodes is connected to the line selection transistor (130).

14. Sensor (100) according to claim 13, further comprising a control circuit configured to implement, for reading a line of pixels (102), at least the following steps:
- turning on the reset transistors (140) of the pixels (102) of said line,
- turning off the line selection transistors (130) of the pixels (102) of said line,
- application of the heating voltage to the ends (116, 118) of the second portion (111) of electrically conductive material or one of the second portions (111) of electrically conductive material associated with said line of pixels (102),
- turning off the reset transistors (140) of the pixels (102) of said line,
- waiting for an integration time corresponding to the measurement of the thermal pattern by the pixels (102) of said line,
- turning on the line selection transistors (130) of the pixels (102) of said line,
- reading the voltages applied to the inputs of the amplifiers (144) of the reading circuits.

* * * * *